United States Patent [19]

Willmann

[11] Patent Number: 5,397,174

[45] Date of Patent: Mar. 14, 1995

[54] HYDRAULIC BRAKING SYSTEM WITH DIFFERENTIAL LOCK, ESPECIALLY FOR MOTOR VEHICLES

[75] Inventor: Karl-Heinz Willmann, Freiberg, Germany

[73] Assignee: Robert Bosch GmbH, Stuttgart, Germany

[21] Appl. No.: 211,298

[22] Filed: Mar. 30, 1994

[30] Foreign Application Priority Data

Sep. 30, 1991 [DE] Germany ............ 41 32 470.6

[51] Int. Cl.⁶ .......................... B60T 13/18; B60T 8/60
[52] U.S. Cl. ........................ 303/113.5; 303/113.2; 303/116.2
[58] Field of Search ............ 303/9.62, 10, 11, 95, 303/103, 110, 111, 113.1, 113.5, 116.1, 113.2, 116.2

[56] References Cited

U.S. PATENT DOCUMENTS

| | | | |
|---|---|---|---|
| 5,125,721 | 6/1992 | Schmidt | 303/9.62 |
| 5,152,586 | 10/1992 | Burgdorf | 303/10 |
| 5,169,214 | 12/1992 | Holzmann et al. | 303/113.2 |
| 5,207,487 | 5/1993 | Holzmann et al. | 303/113.2 |

FOREIGN PATENT DOCUMENTS

| | | | |
|---|---|---|---|
| 482379 | 4/1992 | European Pat. Off. | 303/116.2 |
| 2249148 | 4/1992 | United Kingdom | 303/113.2 |

Primary Examiner—Robert J. Oberleitner
Assistant Examiner—Alfred Muratori
Attorney, Agent, or Firm—Edwin E. Greigg; Ronald E. Greigg

[57] ABSTRACT

A hydraulic braking system having an apparatus for anti-lock control and for generating a differential lock by brake engagement, has a structurally simplified control unit, without any reduction in function. In its brake circuit II for driven vehicle wheels, the braking system with TT brake circuit distribution has valve assemblies associated with the wheel brakes and having an inlet valve and at least one outlet valve for brake pressure modulation. On the master cylinder side, a blocking valve is disposed in a brake line leading to the wheel brakes. A high-pressure pump with a charging valve in a suction line is capable of pumping brake fluid into the brake line. During the duration of the differential lock by brake engagement, the high-pressure pump is driven, in the phase for pressure buildup, the charging valve and the inlet valve of the wheel brake of the vehicle wheel to be slowed down assume the open position, and the inlet valve of the wheel brake of the other vehicle wheel and the blocking valve assume the blocking position, in the phase for pressure holding, the charging valve, the inlet valve of the wheel brake of the other vehicle wheel, and the blocking valve are switched into the blocking position, in the phase for pressure reduction, the charging valve and the inlet valve of the wheel brake of the other vehicle wheel are in the blocking position and the blocking valve is in the open position, in all phases of the brake pressure modulation, the at least one outlet valve remains in the blocking position. Such a hydraulic braking system is suitable in particular for motor vehicles.

1 Claim, 1 Drawing Sheet

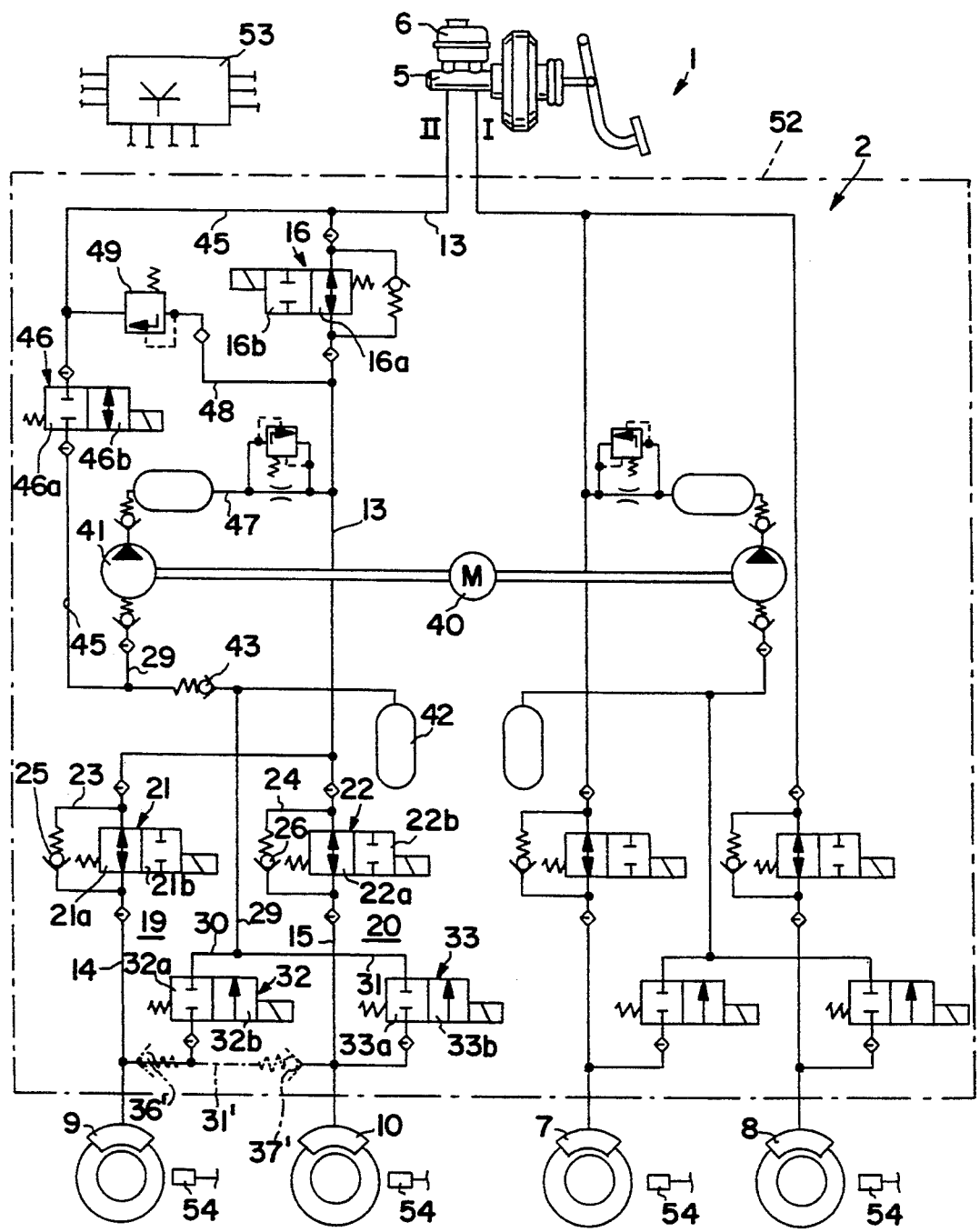

HYDRAULIC BRAKING SYSTEM WITH DIFFERENTIAL LOCK, ESPECIALLY FOR MOTOR VEHICLES

BACKGROUND OF THE INVENTION

The invention is based on a hydraulic braking system, especially for motor vehicles, having a device for antilock control and for generating a differential lock by brake engagement, as defined hereinafter.

A hydraulic braking system has already been proposed (DE-A1-40 34 112), in which both an anti-lock control mode and a traction control or drive slip control mode are possible in a brake circuit associated with the two driven wheels of the vehicle. To that end, the control unit switches the appropriate elements of the braking system in accordance with a predetermined control algorithm. To simultaneously limit drive slip at both driven wheels, it is necessary to equip the braking system with one outlet valve for each of the corresponding wheel brakes and to embody the control unit appropriately. Automobile manufacturers, however, also demand braking systems that for slip limitation allow a braking engagement limited to one driven wheel.

From DE-C1 40 09 640, FIG. 3, a hydraulic braking system is known, in which in all phases of the brake pressure modulation in traction control, the high-pressure pump aspirated pressure fluid via the charging valve switched into its open position and feeds it into the brake line, which is blocked off from the master cylinder by the blocking valve. Pressure fluid not drawn from the wheel brake of the vehicle wheel suffering the drive slip must therefore be diverted from the brake line to the suction line via a pressure limiting valve. Moreover, in the phase for pressure reduction, the outlet valve associated with the affected wheel brake is used for pressure relief.

A traction control apparatus of a hydraulic braking system is also known from DE-C1-39 00 851, in which in the phase for brake pressure buildup a high-pressure pump aspirates pressure fluid from a master cylinder, via a charging valve switched into the open position, and feeds it into a brake line leading to wheel brakes, the brake line being monitored toward the master cylinder by a blocking valve. The feeding of pressure into the wheel brake subjected to the drive slip is done by means of an associated inlet valve of a valve assembly for brake pressure modulation, whose outlet valve remains in its blocking position in all the phases of pressure modulation in traction control. The pressure reduction in the wheel brake is controlled by means of the inlet valve and the blocking valve. The triggering of the high-pressure pump and of the charging valve in the phases for pressure holding and pressure reduction, and of the blocking valve in the first of these phases, is not disclosed.

ADVANTAGES OF THE INVENTION

The braking system according to the invention has the advantage over the prior art that the control unit can be embodied in simplified fashion, since the outlet valve or valves at the valve assemblies are not involved in the modulation of the brake pressure. Another advantage is the provision that the pump does not pump in phases in which no brake pressure needs to be built up, which has a favorable effect on the power requirement of the pump and on its operating noise. Another advantage is that the brake pressure fed into the wheel brake is equivalent to the feed pressure of the high-pressure pump.

BRIEF DESCRIPTION OF THE DRAWING

An exemplary embodiment of the invention is described in detail, in the ensuing description in conjunction with a circuit diagram, shown in the drawing, for a hydraulic braking system for motor vehicles.

DESCRIPTION OF THE EXEMPLARY EMBODIMENT

The exemplary embodiment shown in the drawing relates to a hydraulic braking system 1, having an apparatus 2 for anti-lock control and for generating a differential lock by brake engagement.

The braking system 1 has a pedal-actuatable master cylinder 5 with a pressure fluid tank 6. A first brake circuit I of the braking system 1 is associated with wheel brakes 7, 8 of nondriven vehicle wheels, for example the front axle of the vehicle. Connected to a second brake circuit II are the wheel brakes 9, 10 of driven vehicle wheels, for instance of the rear axle of the vehicle. The braking system 1 therefore has what is known as TT brake circuit distribution. Brake circuit II in connection with the embodiment according to the invention is described in further detail below:

Brake circuit II has a branching brake line 13 beginning at the master cylinder 5. A first brake line branch 14 leads to the wheel brake 9; the wheel brake 10 is connected to a second brake line branch 15. A blocking valve 16 in the form of a 2/2-way valve, with a spring-actuated open position 16a and an electromagnetically switchable blocking position 16b, is disposed on the master cylinder side in the brake line 13. A respective valve assembly 19, 20 is assigned to each wheel brake 9, 10 of brake circuit II for brake pressure modulation, which includes phases of pressure buildup, pressure holding and pressure reduction. The valve assemblies 19, 20 each have a respective inlet valve 21 and 22 disposed in the corresponding brake line branch. 14, 15. These valves are embodied as 2/2-way valves, with a spring-actuated open position 21a and 22a and an electromagnetically switchable blocking position 21b and 22b, respectively. Each inlet valve 21, 22 is bypassed by a bypass line 23 and 24, each with a one-way check valve 25 and 26, respectively. The applicable check valve 25, 26 allows a flow in the direction from the corresponding wheel brake 9, 10 to the master cylinder 5 via brake line 13.

A branched return line 29 begins at the associated brake line branches 14, 15 between the respective inlet valves 21, 22 and wheel brakes 9, 10. A return line branch 30 is connected to the brake line branch 14, and the other return line branch 31 is connected to the brake line branch 15. An outlet valve 32 and 33 belonging to the respective valve assembly 19 and 20 is disposed in each return line branch 30, 31. The outlet valves 32, 33 are also embodied as 2/2-way valves; they have a spring-actuated blocking position 32a and 33a and an electromagnetically switchable open position 32b and 33b. Alternatively, one outlet valve 32 common to the two valve assemblies 19, 20 may be associated with both wheel brakes 9, 10. The outlet valve 33 and the return line branch 31 are then omitted. As suggested by a dot-dashed line, in this variant a return line branch 31' beginning at the return line branch 30 between its connection to the brake line branch 14 and the outlet valve 32, extends on the wheel brake side to the brake line branch 15. On either side of the connection point of the return line branch 31' to the return line branch 30, one check valve 36' and 37' is disposed in each of the two line branches, allowing a flow in the direction from the corresponding brake line branch 14 or 15 to the outlet valve 32.

The return line 29 leads to the intake side of a self-aspirating high-pressure pump 41 that can be driven by an electric drive motor 40. A storage chamber 42 for receiving pressure fluid taken from the wheel brakes 9, 10 is connected to the return line 29 between the intake side of the high-pressure pump 41 and the two outlet valves 32, 33 of the valve assemblies 19, 20. A spring-loaded one-way check valve 43 opening toward the high-pressure pump is also disposed in the return line 29, between the high-pressure pump 41 and the connection of the storage chamber 42.

On the intake side, the high-pressure pump 41 communicates indirectly with the master cylinder 5 through a suction line 45 for pressure fluid, specifically by connection of the suction line 45 to the brake line 13 between the master cylinder 5 and the blocking valve 16. A charging valve 46 embodied as a 2/2-way valve, with a spring-actuated blocking position 46a and an electromagnetically switchable open position 46b, is disposed in the suction line 45. On the pressure side, a supply line 47 for pressure fluid begins at the high-pressure pump 41 and discharges into the brake line 13 between the blocking valve 16 and the valve assemblies 19, 20. Moreover, an overflow line 48, beginning at the brake line 13 between the connection of the supply line 47 and the blocking valve 16 and leading to the suction line 45 between the charging valve 46 and the master cylinder 5, is provided with a pressure limiting valve 49. The pressure limiting valve 49 is adjusted to a response pressure that limits the maximum feed pressure of the high-pressure pump 41.

The elements of the hydraulic braking system 1 disposed between the master cylinder 5 and the wheel brakes 7–10 are part of the apparatus 2 for anti-lock control and for generating a differential lock by brake engagement. They are combined in a so-called hydraulic unit 52, which is represented in the drawing by a dot-dashed line. Also belonging to the apparatus 2 are an electronic control unit 53 and wheel rpm sensors 54 assigned to the individual vehicle wheels. The control unit 53 is capable of evaluating signals of the wheel rpm sensors 54 and converting them into switching signals for both the drive motor 40 and the various electromagnetically actuatable valves of the braking system 1. Both anti-lock control operation and the generation of a differential block at the driven vehicle wheels by brake engagement is possible in brake circuit II. Conversely, in brake circuit I, not described in detail here, only the anti-lock control mode can be carried out.

The operating modes that are possible in brake circuit II of the braking system.1 have the functional course described below:

In normal braking tripped by the vehicle, the valves assume their positions shown. The electrical drive motor 40 is also out of operation. The pressure generated in the master cylinder 5 by pedal actuation is (in brake circuit II) fed into the wheel brakes 9, 10 by the displacement of partial amounts of pressure fluid through the brake line 13 and the brake line branches 14, 15. Both wheel brakes 9, 10 contribute to braking the vehicle. Releasing the brake pedal causes partial quantities of pressure fluid to flow back from the wheel brakes 9, 10 to the master cylinder 5.

If in such braking, the danger of locking arises at the vehicle wheel associated with the wheel brake 9, for instance, this is recognized by the electronic control unit 53 from the signals of the wheel rpm sensors 54. In accordance with a control algorithm stored in memory in the control unit 53, the brake pressure in the wheel brake 9 is modulated, in a manner known per se, in phases for pressure reduction, pressure holding and pressure buildup.

If unallowably great slip arises at the driven vehicle wheels during startup and acceleration of the vehicle, this is also recognized by the control unit 53 from the signals of the wheel rpm sensors 54. The wheel speeds of the two driven wheels are then compared with one another. As soon as a certain speed difference has been exceeded, a brake engagement is initiated at the wheel that is rotating faster, in order to transmit the driving force to the other driven wheel via the vehicle differential. The following modes of operation are possible:

For slowing down the driven wheel associated with the wheel brake 10, for instance, in a first operating mode for generating a differential lock by brake engagement, the high-pressure pump 41 is turned on during the entire control process, while the outlet valves 32, 33 of the valve assemblies 19, 20 (or in the simplified variant, the outlet valve 32) remain in the blocking position 32a, 33a.

In the phase for pressure buildup in the wheel brake 10, the blocking valve 16 is switched into the blocking position 16b; the charging valve 46 is switched into the open position 46a; and the inlet valve 21 associated with the other wheel brake 9 is switched into the blocking position 21b, while the inlet valve 22 associated with the wheel brake 10 remains in the open position 22a. Pressure fluid aspirated from the master cylinder 5 by the high-pressure pump 41 is pumped into the brake line 13, and brake pressure is built up in the wheel brake 10. (In the variant, the check valve 36' in the return line branch 30 prevents the feeding of brake pressure into the wheel brake 9.)

In the phase for pressure holding, the blocking valve 16 remains in the blocking position 16b, and the inlet valve 21 associated with the wheel brake 9 remains in the blocking position 21b, while the charging valve 46 is switched into the blocking position 46a. The inlet valve 22 associated with the wheel brake 10 may assume any arbitrary position. Since the pumping by the high-pressure pump 41 is prevented, essentially no change in the brake pressure fed into the wheel brake 9 occurs.

In the phase for pressure reduction in the wheel brake 10, the charging valve 46 remains in the blocking position 46a, and the inlet valve 21 associated with the wheel brake 10 also remains in its blocking position 21b. The blocking valve 16 is switched to the open position 16a; the position of the inlet valve 22 associated with the wheel brake 10 may be arbitrary. By displacing partial quantities of pressure fluid back to the master cylinder 5 through the inlet valve 22 or through the bypass line 24, a relief of brake pressure occurs in the wheel brake 10.

Upon the end of the control mode, the high-pressure pump 41 is switched off, and the valves of brake circuit II are returned to the positions shown.

In this operating mode, because of the inhibited pumping in the phases for pressure holding and for pressure reduction, reduced noise is attained along with a reduced power loss on the part of the high-pressure pump 41, because an excess volume of pressure fluid need not be diverted via the pressure limiting valve 49.

In a second operating mode of the apparatus 2 for generating a differential lock by brake engagement, the outlet valves 32, 33 (or in the variant, the outlet valve 32) and likewise not involved in the control procedure. During the entire control procedure, the charging valve 46 occupies its open position 46b; the high-pressure pump 41 is also switched on.

To feed brake pressure into the wheel brake 10 in the phase for pressure buildup, the blocking valve 61 is switched into the blocking position 16b, and the inlet valve 21 associated with the wheel brake 9 is switched into the blocking position 21b, while the inlet valve 22 remains in its open position 22a.

In the phase for pressure holding, the blocking valve 16 remains in the blocking position 16b, and the inlet valve 21 remains in the blocking position 21b. The inlet valve 22 in the brake line branch 15 leading to the wheel brake 10 is likewise switched to the blocking position 22b. Pressure fluid continuing to be pumped by the high-pressure pump 41 is diverted via the pressure limiting valve 49.

In the phase for pressure reduction in the wheel brake 10, the blocking valve 16 is switched to the open position 16a. The inlet valve 21 associated with the wheel brake 9 remains in the flowing position 21b. The brake pressure in the wheel brake 10, with the inlet valve 22 now occupying its blocking position 22b, can now decrease through the bypass line 24 and the check valve 26, or if the inlet valve 22 is in its open position 22a can decrease by flowing through it to the master cylinder 5.

Upon termination of the control procedure, the high-pressure pump 41 is switched off; the valves in brake circuit II are likewise returned to their positions shown.

Because of the noninvolvement of the blocking valves 32, 33 (or in the variant, the blocking valve 32) in the two operating modes, the situation in which, for example upon braking tripped by the vehicle driver, pressure fluid flows out into the storage chamber 42 and reduces the effective holding volume of the storage chamber in an immediately ensuing anti-lock control mode, is moreover prevented in phases for pressure reduction. In both operating modes for generating a differential lock by brake engagement, the check valve 43 in the return line 29, which prevents impermissible underpressure in the wheel brakes 9, 10 when the high-pressure pump 41 is on and the outlet valve 32 and 33 are switched into their open positions 32b and 33b, assures that no pressure fluid will flow through the suction line 45 into the storage chamber 42 at the onset of braking, when the charging valve 46 is switched to the open position 46b.

I claim:

1. A hydraulic braking system (1), for motor vehicles, having an apparatus (2) for anti-lock control and for generating a differential lock by brake engagement, which includes:

a master cylinder (5), from which at least one brake line (13) branching to two wheel brakes (9, 10) of a brake circuit II of driven vehicle wheels originates, valve assemblies (19, 20), associated with the wheel brakes (9, 10), for brake pressure modulation including phases for pressure buildup, pressure holding and pressure reduction, these assemblies each comprising an inlet valve (21, 22), disposed in the respective brake line branch (14, 15), having an open position (21a, 22a) respectively as a position of repose and a blocking position (21b, 22b), and at least one outlet valve (21, 22, 32), with a blocking position (32a) as a position of repose and an open position (32b), wherein in the phase for pressure buildup, the inlet valve (22) of one of the wheel brakes (9, 10) of a vehicle wheel to be slowed down assumes the open position (22a), and the inlet valve (21) of the other wheel brake (10, 9) of another vehicle wheel, in all phases of brake pressure modulation, assumes the blocking position (21b, 16b);

a bypass line (23, 24), that bypasses the respective inlet valves (21, 22), and having a check valve (25, 26) which allows a flow from the wheel brakes (9, 10) to the master cylinder (5);

a blocking valve (16), disposed in the brake line (13) and having an open position (16a) as a position of repose and a blocking position (16b) assumed in the phases for pressure buildup and pressure holding;

a self-aspirating high-pressure pump (41), which on an intake side is connected to a suction line (45) for pressure fluid between the master cylinder (5) and the blocking valve (16) and on a pressure side to the brake line (13), via a supply line (47) for pressure fluid, between the blocking valve (16) and the wheel brakes (9, 10) and is driven during differential lock by brake engagement;

a charging valve (46), disposed in the suction line (45) and having a blocking position (46a) as a position of repose and an open position (46b) assumed in the phase for pressure buildup;

a return line (29) leading to the intake side of the high-pressure pump (41), which is connected to the respective brake line branch (14, 15) by line branches (30, 31) between the wheel brakes (9, 10) and the inlet valve (21, 22);

a storage chamber (42), connected to the return line (29), for receiving pressure fluid drawn from the wheel brakes (9, 10);

a control unit (53) for switching the high-pressure pump (41), the blocking valve (16), the charging valve (46), and the valves (21, 22, 32) of the valve assemblies (19, 20) for brake pressure modulation as a function of the wheel rotation behavior, in the phase for pressure holding, the charging valve (46) assumes its blocking position (46a);

in the phase for pressure reduction, the charging valve (46) assumes the blocking position (46a) and the blocking valve (16) assumes the open position (16a); and in all phases of the brake pressure modulation, the at least one outlet valve (21, 22, 32) remains in the blocking position (32a).

* * * * *